US012000172B2

United States Patent
Konrad et al.

(10) Patent No.: US 12,000,172 B2
(45) Date of Patent: Jun. 4, 2024

(54) VEHICLE DOOR HANDLE HAVING A DISPLAY ELEMENT

(71) Applicant: DAIMLER AG, Stuttgart (DE)

(72) Inventors: Tobias Konrad, Böblingen (DE); Martin Lindmayer, Sulz (DE)

(73) Assignee: MERCEDES-BENZ GROUP AG, Stuttgart (DE)

( * ) Notice: Subject to any disclaimer, the term of this patent is extended or adjusted under 35 U.S.C. 154(b) by 307 days.

(21) Appl. No.: 17/414,472

(22) PCT Filed: Oct. 22, 2019

(86) PCT No.: PCT/EP2019/078656
§ 371 (c)(1),
(2) Date: Jun. 16, 2021

(87) PCT Pub. No.: WO2020/126157
PCT Pub. Date: Jun. 25, 2020

(65) Prior Publication Data
US 2022/0074229 A1  Mar. 10, 2022

(30) Foreign Application Priority Data
Dec. 19, 2018  (DE) ..................... 10 2018 010 032.5

(51) Int. Cl.
*E05B 17/10* (2006.01)
*B60Q 1/26* (2006.01)
(Continued)

(52) U.S. Cl.
CPC ............ *E05B 17/10* (2013.01); *B60Q 1/2669* (2013.01); *B60Q 1/5037* (2022.05); *B60Q 1/545* (2022.05);
(Continued)

(58) Field of Classification Search
CPC ........ E05B 17/10; E05B 17/226; E05B 81/77; E05B 85/16; B60Q 1/2669; B60Q 1/5037;
(Continued)

(56) References Cited

U.S. PATENT DOCUMENTS 7,350,949 B2   4/2008   Meinke et al.
10,407,024 B2  9/2019   Müller et al.
(Continued)

FOREIGN PATENT DOCUMENTS

CN   105201286 A   12/2015
CN   205370188 U    7/2016
(Continued)

OTHER PUBLICATIONS

Office Action dated Aug. 2, 2022 in related/corresponding CN Application No. 201980082877.0.
(Continued)

*Primary Examiner* — Pei Yong Weng
(74) *Attorney, Agent, or Firm* — PATENT PORTFOLIO BUILDERS PLLC

(57) ABSTRACT

A vehicle door handle includes an external visible surface having a display element. The display element includes a surface having a plurality of individually controllable pixels that are controllable via a control unit depending on a user interface. Displaying content on the display element of such a vehicle door handle involves the display content being predetermined or pre-stored display content retrieved via the user interface.

15 Claims, 2 Drawing Sheets

Figure 1:
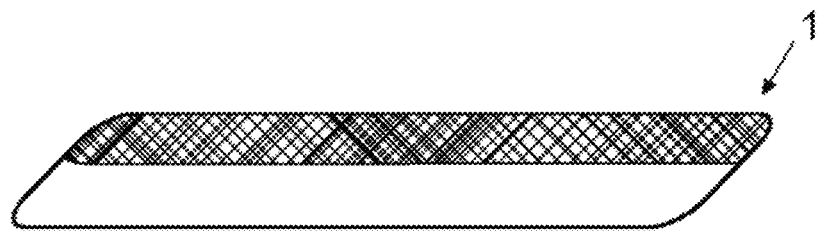
Figure 1:
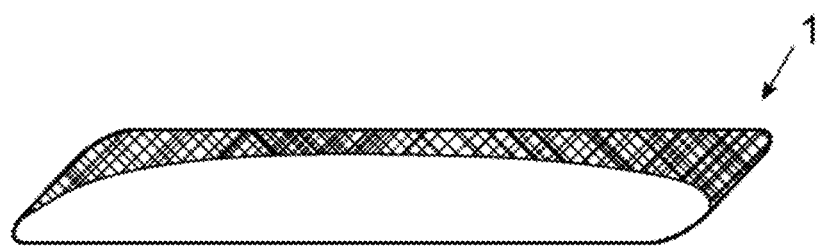
Figure 1:
Figure 1:
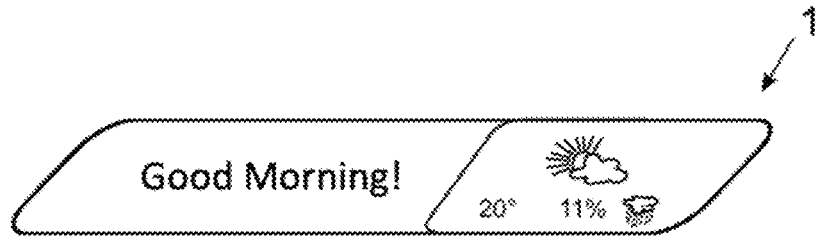
Figure 1:
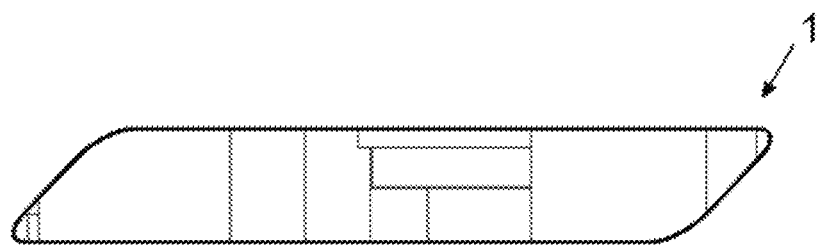

(51) Int. Cl.
*B60Q 1/50* (2006.01)
*E05B 17/22* (2006.01)
*E05B 81/76* (2014.01)
*E05B 85/16* (2014.01)

(52) U.S. Cl.
CPC ............ *B60Q 1/549* (2022.05); *E05B 17/226* (2013.01); *E05B 81/77* (2013.01); *E05B 85/16* (2013.01); *B60Q 2900/30* (2013.01)

(58) Field of Classification Search
CPC .... B60Q 1/545; B60Q 1/549; B60Q 2900/30; B60Q 3/14; B60Q 3/267; B60Q 3/745; B60Q 3/80
See application file for complete search history.

(56) References Cited

U.S. PATENT DOCUMENTS

| | | | |
|---|---|---|---|
| 10,460,684 B2 | 10/2019 | Laack et al. | |
| 10,787,177 B2 * | 9/2020 | Fritz | B60K 35/00 |
| 2010/0321945 A1 | 12/2010 | Lang et al. | |
| 2013/0130674 A1 * | 5/2013 | De Wind | E05B 81/54 |
| | | | 362/546 |
| 2017/0247016 A1 | 8/2017 | Krishnan | |
| 2017/0253216 A1 | 9/2017 | Nishidai et al. | |
| 2019/0218836 A1 * | 7/2019 | Trabucco | B60R 13/0243 |

FOREIGN PATENT DOCUMENTS

| | | |
|---|---|---|
| DE | 102010023941 A1 | 7/2011 |
| DE | 102015101164 A1 | 7/2015 |
| DE | 102014209300 A1 | 12/2015 |
| DE | 102017203522 A1 | 9/2017 |
| DE | 102016224260 A1 | 6/2018 |
| DE | 102017102321 A1 | 8/2018 |
| WO | 2015113557 A1 | 8/2015 |

OTHER PUBLICATIONS

Office Action created Oct. 10, 2022 in related/corresponding DE Application No. 10 2018 010 032.5.
International Search Report mailed Dec. 6, 2019 in related/corresponding International Application No. PCT/EP2019/078656.
Office Action created Aug. 6, 2019 in related/corresponding DE Application No. 10 2018 010 032.5.
Written Opinion mailed Dec. 6, 2019 in related/corresponding International Application No. PCT/EP2019/078656.

* cited by examiner

VEHICLE DOOR HANDLE HAVING A DISPLAY ELEMENT

BACKGROUND AND SUMMARY OF THE INVENTION

Exemplary embodiments of the invention relate to a vehicle door handle having an external visible surface which has a display element, a method for displaying content on the display element of such a vehicle door handle, and to an application program in a mobile terminal for programming a user interface for such a vehicle door handle.

Vehicle door handles having display elements for illuminating the vehicle door handle and, where appropriate, a handle recess associated with the vehicle door handle and/or the surroundings of the vehicle door by means of illuminants in the vehicle door handle are known from the prior art. DE 10 2015 101 164 A1 describes a door handle with illumination, which can be used for actuating a lock of a moveable part of a motor vehicle, such as a door, a tailgate, or similar. Various statuses can be visualized via individual discrete display elements, which are, for example, in the form of preferably three light elements, for example whether a virtual actuation of the door handle has been detected and/or the status of a door lock associated with the door handle.

From the further general prior art, for example in the form of DE 10 2017 102 321 A1, display arrangements are also known that can be seamlessly integrated into a surface in order to display colors or other types of information, for example. Technically, these display arrangements can be based, for example, on organic LEDs (OLED) or similar.

In addition to the pure display of information, there is also an increasing desire to individualize individual products such as vehicles. The customer expects the vehicle to be designed as individually and personally as possible and/or to respond to him/her. In order to be able to fulfil such wishes in the region of the external surface of a vehicle as well, exemplary embodiments of the present invention are directed to a vehicle door handle having a display element in such a way that it offers a wide range of individualization options.

The vehicle door handle according to the invention provides that the display element comprises an area with a plurality of individually controllable pixels, which are controllable via a control device depending on a user interface. Such an array of individual pixels, which is used as a display element, in contrast to the use of three individual LEDs as in the prior art, offers the possibility of a comprehensive visualization corresponding to the larger number of pixels and thus, in effect, the resolution achievable via this larger number of individually controllable pixels. By way of example, graphical patterns, texts, different colors or color gradients can be reproduced on the door handle on such a display element according to the invention. By way of example, a chrome trim can be visually simulated or a static text or message can be visualized in scrolling text. In addition, various patterns can be displayed, for example a pattern based on the vehicle interior, which may be customized, such that the door handles appear in the same wood look, carbon look or metal look of interior trim, for example. Other types of individualization, for example the display of pictograms, photographs, or similar, are also possible with such a vehicle door handle according to the invention.

According to an advantageous development of the vehicle door handle according to the invention, it can be provided that the display element comprises a liquid crystal display. Such a liquid crystal display, which is also referred to as an LED screen or LED display with corresponding background illumination by LEDs, is capable of individually displaying a large number of patterns and colors with high resolution with a correspondingly simple structure. Such displays are generally known and common in smartphones, for example, where they achieve a very high color depth with correspondingly high resolution and high contrasts. Such liquid crystal displays can be combined or backlit with various types of light-emitting diodes or organic light-emitting diodes (LED or OLED). Alternatively, or additionally, the display device can also comprise a matrix of light points, LEDs or OLEDs, which are then formed as a so-called field or array of individual points. These can perform the corresponding optical tasks simply, efficiently, and relatively energy-efficiently with or without a liquid crystal layer arranged above them.

The door handle itself can be designed in a manner known per se as a mechanically moveable actuating handle which is moved relative to a panel of the door, the tailgate or similar in order to unlock and, for example, to open the door or the tailgate accordingly. In accordance with a very advantageous embodiment of the invention, it can be formed flush with the door paneling, which can also include the paneling of a tailgate or similar, so as to be integrated in the design of the vehicle.

Alternatively, it is of course also conceivable for the vehicle door handle to be implemented in an alternative embodiment in such a way that it is arranged as a non-moveable part on the door paneling or the paneling of a tailgate or similar. Such door handles are also known in principle and are typically actuated by touching, brushing along the door handle or similar, without the door handle itself having to be designed as a mechanically moveable part. In particular, this embodiment is advantageous in the embodiment described here, since the supply of control lines and lines for suppling power to the display element can be implemented very simply in the non-moveable door handle, without the fear that these lines will be impaired by the frequent mechanical movement when the door handle is moved in continuous use.

The method according to the invention for displaying content on the display element of such a vehicle door handle in one of the embodiments described above provides, according to the invention, that display content is predetermined, or pre-stored display content is called up via the user interface. The vehicle door handle is then not only capable of visualizing a pre-programmed display, but can also be individually adapted via the user interface in order, for example, to carry out the visual design of the door handle in accordance with user specifications. The content of the display can be individually selected and specified by the user, effectively self-designed, or the user can access pre-stored content and select the corresponding design from a plurality of predetermined designs according to his/her wishes and ideas.

According to an extraordinarily advantageous development of the method according to the invention, it is provided that the user interface comprises sensors for detecting the approach of a person potentially using the vehicle, wherein in the event of a detected approach, a content associated with the person and possibly at least one further parameter is displayed on the display element. The display element can thus detect, via suitable sensors of the vehicle, for example a camera or a sensor that detects the approach of a radio key, a mobile phone known to it or similar, that a person who is a potential user is approaching the vehicle. When the person approaches, a display content can then be shown that is assigned to this person, so that an effectively individual greeting can be given to the person. By way of example, the person may have specified in advance that he/she always wants to be received with a corresponding color or text message on the display element when approaching the vehicle. At least one further parameter can also be taken into account. In the simplest case, this can be the time of day, for example, such that a selection is made automatically between a "good morning" text message, a "good day" text message and a "good evening" text message.

Further parameters can be, for example, according to an advantageous development of the invention, in addition to the time-dependent variables, also location-dependent, weather-dependent, date-dependent, or temperature-dependent variables. By way of example, on a predetermined date, the approaching person can be wished a happy birthday, or, for example, a different design can be displayed in the business environment, for example in the car park of the company, than in the leisure time of the corresponding person.

Thus, as already indicated, the content assigned to a person can be freely programmable. According to this advantageous development, for example, the color, a text, or generally the design, i.e., a color distribution or a virtual shaping of the door handle, can be freely programmed by the respective user by means of a corresponding graphical and according to the user's wishes.

A further very advantageous embodiment of this idea of free programming provides that a design or color pattern is detected via an optical sensor and stored as the content associated with a person and/or reproduced directly on the display element. By way of example, a person can detect a pattern that he/she particularly likes, be it a pattern from the interior of the vehicle or any other pattern, such as that of a piece of clothing or similar, accordingly via an optical sensor, for example a camera, by holding the pattern within the range of a vehicle-integrated camera or an external camera. This pattern can then be either directly displayed and/or stored as an individual pattern and later displayed again and again as a greeting when that person approaches. It is also conceivable to permanently store this pattern independently of other parameters such that, for example, this pattern can always be recognized when the display element in the vehicle door handle is switched on.

The display content can be selected alternatively or additionally depending on the vehicle interior, ambient interior lighting, and/or from pre-programmed design examples. In addition to individualization via the camera, it is therefore also conceivable that a type of "pre-individualization" has been carried out by the vehicle manufacturer, such that, for example, in the case of an interior individually designed via a modular system, it offers design elements of this interior, be it the design of trim strips, the design of the upholstery of the seats or similar, as display content from which appropriate selections can be made, such that the corresponding designs are then displayed either as a welcome function or permanently in the vehicle door handle.

An application program according to the invention in a mobile terminal, such as a smartphone, for programming a user interface for the vehicle door handle or the method thereby comprises a user interface and is characterized in that content is created in the user interface, selected from pre-stored or online retrievable design examples, or captured via a camera of the mobile terminal and then transmitted to the vehicle door handle as display content. Programming is then made possible simply and efficiently via a corresponding application program, which is also referred to as an app, for example on a smartphone. When this smartphone approaches, for example, the programming stored there for the vehicle door handle can be used, such that for different people using the vehicle, each of whom has the corresponding app with their individual programming on the smartphone, it is always ensured that the individually adapted display appears on the vehicle door handle for the respective person. The content can be customized in the user interface with additional parameters such that, for example, the smartphone's calendar entries are taken into account, whether to display appointments, reminders or even, for example to visualize a weather report on the door handle and/or to wish the smartphone owner a happy birthday on his/her birthday, for example.

Further advantageous embodiments of the idea also arise from the exemplary embodiment, which is explained in more detail below with reference to the figures.

BRIEF DESCRIPTION OF THE DRAWING FIGURES

Figure 2:
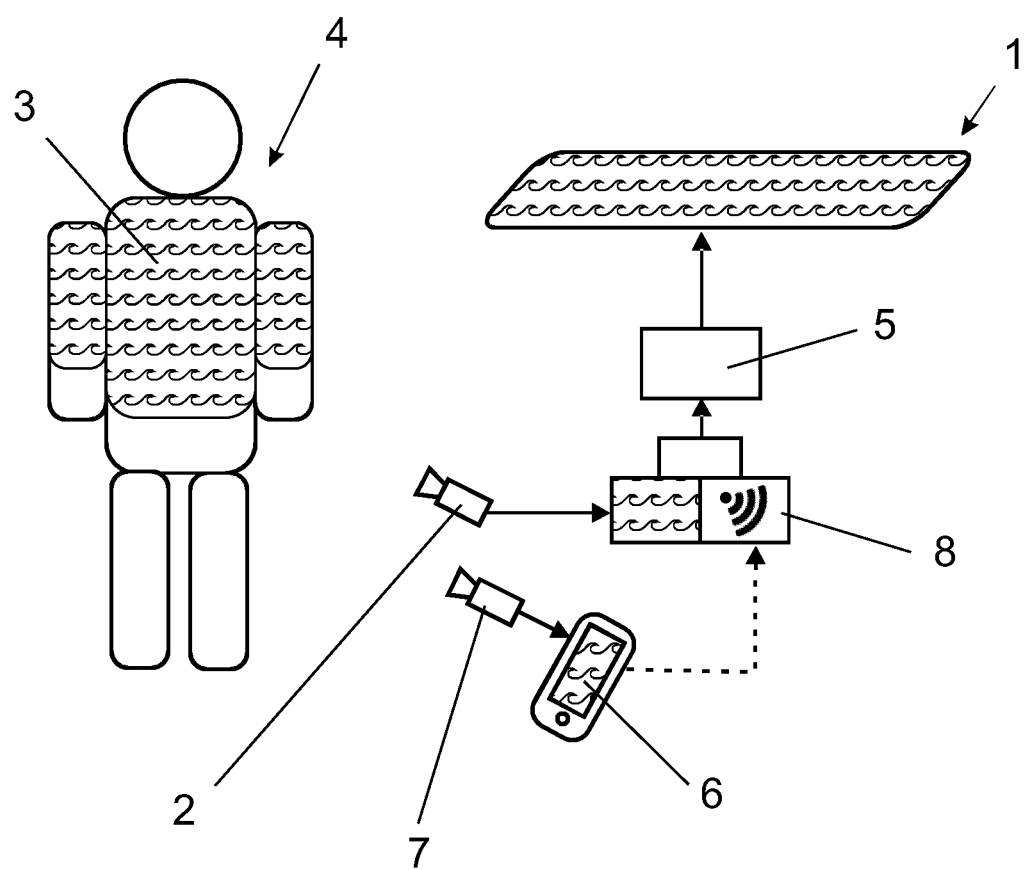

Here are shown:

FIGS. 1a)-1e) various examples of the individual design of a vehicle door handle according to the invention; and FIG. 2 a possible procedure for individualizing a vehicle door handle.

DETAILED DESCRIPTION

In addition to exterior door handles painted purely in the vehicle color, those with additional chrome trim or those with an exterior visible surface painted in a contrasting color to the vehicle color, the vehicle door handle according to the invention makes it possible to design it flexibly and programmably in terms of its design. The depiction in FIGS. 1a)-1e) illustrate different views of one and the same vehicle door handle 1, wherein its entire surface visible here is to be designed in the form of a display element having a plurality of individually controllable pixels, for example as an OLED display. This display element now permits corresponding individualization.

In the depiction in FIG. 1a), for example, the irregular cross-hatching in the upper part is intended to indicate a chrome trim, while the lower part is intended to be depicted, for example, in the color of the car or in a color which harmonizes or contrasts with the color of the car. This can now be individually programmed accordingly.

In the depiction in FIG. 1b), for example, a different boundary line is depicted between the virtual chrome region and the colored region.

The depiction in FIG. 1c) is intended to show a vehicle door handle 1 which is set, for example, in a color or color gradient according to the user's individual preferences.

In the example of FIG. 1d), the depiction of writing, in this case "Good Morning", as well as the depiction of a weather forecast, is displayed. This data can be downloaded from the Internet, for example, and visualized accordingly. By way of example, the greeting "Good Morning" can always be displayed in the morning, while in the evening or afternoon "Good day" or "Good evening" would be displayed. The parameter for control here is simply the time. Further parameters, such as the date, a date-related event such as a birthday or similar, could also be taken into account, such that a user would be wished a happy birthday. The temperature can also be displayed in accordance with the measured temperature in the vehicle and, for example, the danger of black ice can be indicated if the temperature is below 3° C.

FIG. 1e) depicts the example of a graphical pattern on the vehicle door handle 1. This can, for example, bear a design desired by the user, it can also, for example, imitate the wood look of trim strips in the interior, the look of seat covers, or similar, in order to obtain a consistent but individual design concept for the vehicle. In addition, many other graphical depictions on the display element of the vehicle door handle 1 are conceivable, for example also the display of photographs, of video sequences recorded by a camera, for example of the vehicle, or similar. All this can be done permanently or, in particular, as a greeting function when the vehicle has detected the approach of a user. This can be detected, for example, by means of a radio key of the user brought close to the vehicle. Different radio keys can be provided with various individualization features, such that, for example, the radio key used by person A results in a different graphical depiction in the display element of the vehicle door handle 1 than the approach of another radio key used by person B for the same vehicle. In addition, the approach of the user and the user himself/herself can be detected, for example, via a camera of the vehicle. He/she can further be detected by other means, for example, by an approach of a mobile terminal assigned to him/her, for example a smartphone.

This very smartphone can then also be used with a corresponding application programming or app on the smartphone to set the individual appearance of the vehicle door handle 1 accordingly via the user interface of the app. The individualization can then be carried out explicitly in accordance with a selection in the user interface, wherein predetermined designs or designs available on the internet are downloaded. Alternatively, or in addition to this, designs can also be created based on optical sensors such as cameras in particular. By way of example, a design can be created accordingly by means of a camera of the vehicle depicted in FIG. 2 and designated 2. In this case, the camera 2 is to detect the design of a garment designated 3 of a user 4. This design is then provided to the display element in the vehicle door handle 1 via a control unit 5.

An alternative would be, for example, to use a smartphone 6 as a mobile terminal. In the already mentioned user interface of an application programming or app running on it, a comparable image could then be captured via the integrated camera 7 of the smartphone 6 in this case and transmitted via Wi-Fi, Bluetooth, or similar, for example, to a communication interface 8 and from there to the control device 5, in order to then be depicted accordingly on the display element of the vehicle door handle 1.

This depiction of a special pattern based on the clothing 3 of the user 4 is, of course, only one example. Other graphical elements inside or outside the vehicle can also be captured as a design specification and directly depicted and stored for later use, be it, for example, a look of natural materials in the user's surroundings or even individual pictures or individual colors, such as the colors of the nail polish of a person using the vehicle.

It goes without saying that, in addition to such a pattern, content, such as a chrome trim in the upper region, or content, such as scrolling text or a static text display, can also be used, which is then combined with or superimposed on the pattern accordingly.

In principle, a permanent display of the corresponding patterns is conceivable, in particular they can be used for an individualized greeting in the case of an approach detection.

In the de-energized state, the vehicle door handles can then display, for example, a basic color of the display element, e.g., black, or, if the display element is designed to be correspondingly transparent, also a basic color that shines through the display element, which can correspond in particular to the painted car color.

Although the invention has been illustrated and described in detail by way of preferred embodiments, the invention is not limited by the examples disclosed, and other variations can be derived from these by the person skilled in the art without leaving the scope of the invention. It is therefore clear that there is a plurality of possible variations. It is also clear that embodiments stated by way of example are only really examples that are not to be seen as limiting the scope, application possibilities or configuration of the invention in any way. In fact, the preceding description and the description of the figures enable the person skilled in the art to implement the exemplary embodiments in concrete manner, wherein, with the knowledge of the disclosed inventive concept, the person skilled in the art is able to undertake various changes, for example, with regard to the functioning or arrangement of individual elements stated in an exemplary embodiment without leaving the scope of the invention, which is defined by the claims and their legal equivalents, such as further explanations in the description.

The invention claimed is:

1. A vehicle door handle, comprising:
an external visible surface having a display element,
wherein the display element comprises a surface having a plurality of individually controllable pixels that are controllable via a control device depending on a user interface,
wherein, via the user interface, content is created, selected from pre-stored or online retrievable design examples, or captured via a camera of a mobile terminal,
wherein an application program of the mobile terminal is configured so that the created, selected, or captured content is transmitted to the vehicle door handle as display content,
wherein the user interface includes sensors that detect approach of a first person to the vehicle, and
wherein, responsive to the sensors detecting an approach of the first person, content assigned to the first person and at least one other parameter is displayed on the display element,
wherein the sensors detect approach of a second person to the vehicle,
wherein, responsive to the sensors detecting an approach of the second person, content assigned to the second person and at least one other second parameter is displayed on the display element, and
wherein the vehicle door handle is an external vehicle door handle.

2. The vehicle door handle of claim 1, wherein the display element comprises a liquid crystal display.

3. The vehicle door handle of claim 1, wherein the display element comprises a matrix of light points, which comprise light emitting diodes or organic light emitting diodes.

4. The vehicle door handle of claim 1, wherein the vehicle door handle is a mechanically moveable actuating handle.

5. The vehicle door handle of claim 4, wherein the external visible surface is formed flush with a door panel in a non-actuated state.

6. The vehicle door handle of claim 1, wherein the vehicle door handle is a non-moveable part on a door panel.

7. A method for displaying content on a display element on an external visible surface of a vehicle door handle, wherein the method comprises:
   determining the content to display on the display element, wherein the content is predefined via a user interface, is selected from pre-stored or online retrievable design examples retrieved via the user interface, or is captured via a camera of a mobile terminal; and
   displaying the determined content on the display element, wherein the created, selected, or captured content is transmitted to the vehicle door handle;
   detecting, using sensors of the user interface, an approach of a first person to the vehicle;
   determining content associated with the first person;
   depicting, on the display element responsive to the detected approach of the first person, the content associated with the first person and at least one further parameter;
   detecting, using the sensors of the user interface, an approach of a second person to the vehicle;
   determining content associated with the second person;
   depicting, on the display element responsive to the detected approach of the second person, the content associated with the second at least one other second parameter.

8. The method of claim 7, wherein the at least one further parameter is a time-, location-, weather-, date- or temperature-dependent variable.

9. The method of claim 7, wherein content associated with the first person and the second person is freely programmable.

10. The method of claim 9, wherein the content associated with the first person and the second person is freely programmable with respect to color, a text, or a graphical design.

11. The method of claim 7, further comprising:
   detecting, via an optical sensor, a design or color pattern; and
   storing the detected design or color pattern as the content associated with the first person or with the second person, or reproducing the detected design or color pattern directly on the display element.

12. The method of claim 7, wherein the determined content is selected at least partially depending on a vehicle interior, an ambient interior lighting, or from pre-programmed design examples.

13. A method comprising:
   detecting, using sensors of a first mobile terminal, that a first person is approaching a vehicle;
   transmitting, from the first mobile terminal to a door handle of the vehicle, first determined content, wherein the first determined content is predefined via the first mobile terminal, is selected from pre-stored or online retrievable design examples retrieved via the first mobile terminal, or is captured via a camera of the first mobile terminal;
   displaying, on a display element on an external visible surface of the door handle, the first determined content and at least one first further parameter;
   detecting, using sensors of a second mobile terminal, that a second person is approaching a vehicle;
   transmitting, from the second mobile terminal to a door handle of the vehicle, second determined content, wherein the second determined content is predefined via the second mobile terminal, is selected from pre-stored or online retrievable design examples retrieved via the second mobile terminal, or is captured via a camera of the second mobile terminal;
   displaying, on the display element on the external visible surface of the door handle, the second determined content and at least one second further parameter.

14. The method of claim 13, wherein the at least one first further parameter and the at least one second further parameter is a time-, location-, weather-, date- or temperature-dependent variable.

15. The method of claim 13, further comprising:
   detecting, via the camera of the first mobile terminal, a design or color pattern; and
   storing, in the mobile terminal, the detected design or color pattern as content associated with the first person.

* * * * *